United States Patent [19]
Tzanev

[11] Patent Number: 5,777,290
[45] Date of Patent: Jul. 7, 1998

[54] BANK ANGLE SENSOR

[75] Inventor: Oleg A. Tzanev, Waukesha, Wis.

[73] Assignee: Harley-Davidson Motor Company, Milwaukee, Wis.

[21] Appl. No.: 679,376

[22] Filed: Jul. 8, 1996

[51] Int. Cl.⁶ .................................. H01H 35/02
[52] U.S. Cl. .................. 200/61.52; 307/10.1; 335/205
[58] Field of Search ................... 73/1.37, 1.38, 73/1.41, 488, 503, 514, 514.16, 514.31, 514.34; 180/282; 200/61.45 R–61.45 M; 280/734, 735; 307/9.1, 10.1, 119, 120, 121, 141, 141.4; 324/117 R, 117 H, 207.2, 207.13, 251, 162, 178, 179; 338/32 R, 32 H; 340/71, 573, 669, 670; 335/201, 202, 205; 361/195, 196; 240/53

[56] References Cited

U.S. PATENT DOCUMENTS

| | | | |
|---|---|---|---|
| 3,601,729 | 8/1971 | Hierta | 335/205 |
| 3,748,415 | 7/1973 | Suzuki | 200/61.45 M |
| 3,763,484 | 10/1973 | Byers | 340/262 |
| 3,867,844 | 2/1975 | Shimizu et al. | 73/517 R |
| 4,275,378 | 6/1981 | Henderson | 340/71 |
| 4,536,755 | 8/1985 | Holzgang et al. | 340/573 |
| 4,866,379 | 9/1989 | Odagawa et al. | 324/207 |
| 4,972,595 | 11/1990 | Shimamura et al. | 33/366 |
| 5,202,559 | 4/1993 | Durst | 250/231.1 |
| 5,209,343 | 5/1993 | Romano et al. | 200/61.52 |
| 5,332,876 | 7/1994 | Romano et al. | 200/61 |
| 5,359,286 | 10/1994 | Kaiser et al. | 324/207.2 |
| 5,365,116 | 11/1994 | Lohss | 307/121 |
| 5,365,671 | 11/1994 | Yaniger | 33/366 |
| 5,373,125 | 12/1994 | Ford et al. | 200/61.25 |
| 5,391,845 | 2/1995 | Haas et al. | 200/61.45 R |
| 5,602,429 | 2/1997 | Segiebelhuth | 307/121 |

*Primary Examiner*—Michael L. Gellner
*Assistant Examiner*—Michael A. Friedhofer
*Attorney, Agent, or Firm*—Michael, Best & Friedrich LLP

[57] ABSTRACT

A tilt angle sensor has a body which includes a V-shaped cavity defined by a pair of inclined surfaces which intersect to define a lower end. A roller is disposed in said cavity. A sensing circuit is associated with the cavity to sense the presence of the roller in the lower end of the cavity. The sensing circuit initiates a first signal when the roller is displaced from the lower end of the cavity. A timing circuit is coupled to the sensing circuit for commencing a timing cycle upon the occurrence of the first signal and for providing a second signal after a predetermined time delay. A latch mechanism coupled to the timing circuit latches an output device upon the occurrence of the second signal.

12 Claims, 1 Drawing Sheet

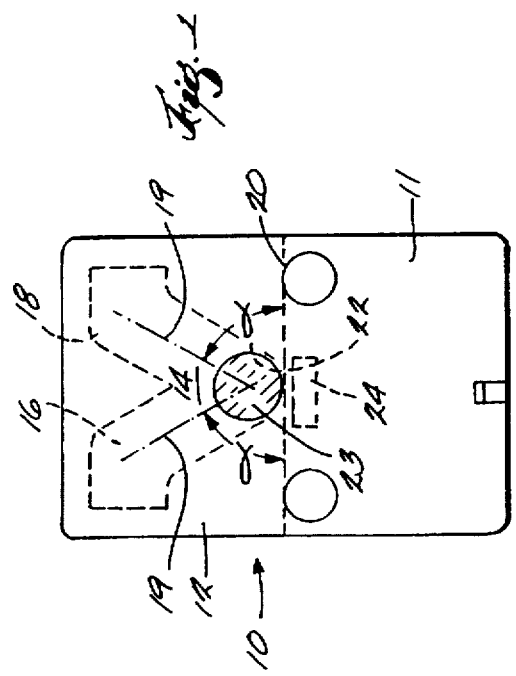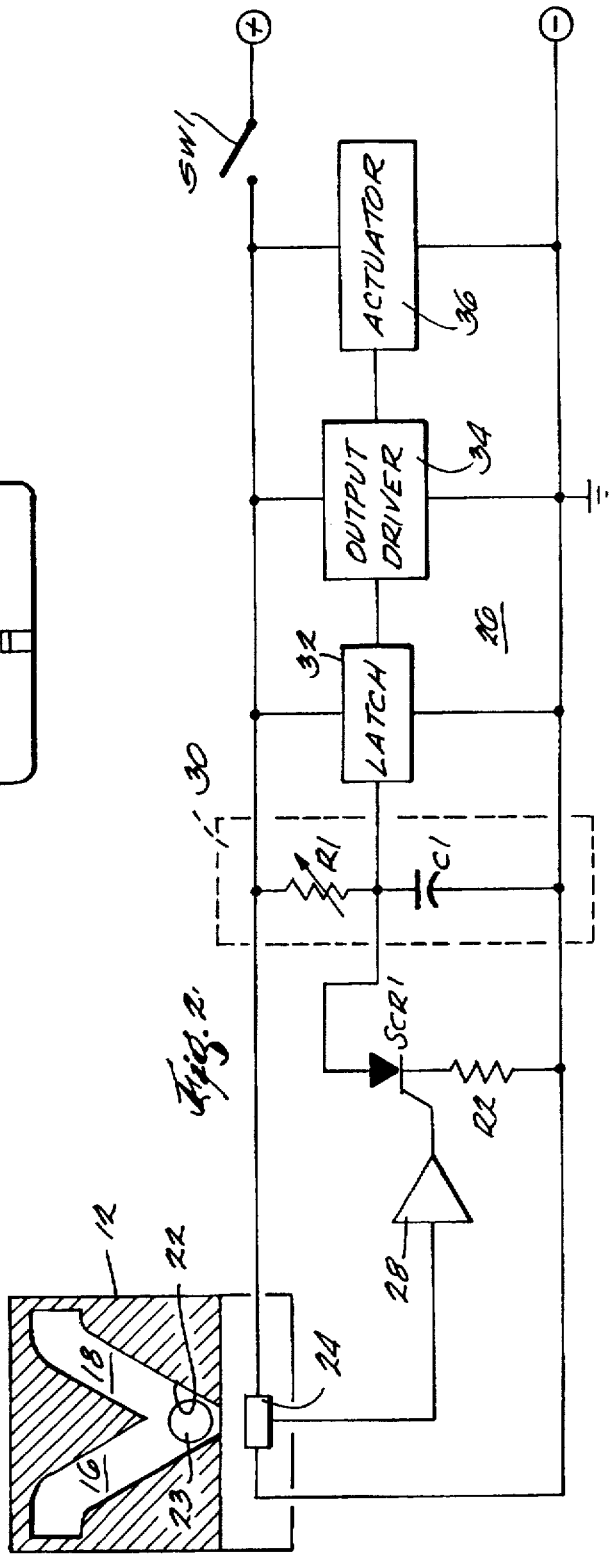

5,777,290

1

BANK ANGLE SENSOR

BACKGROUND OF THE INVENTION

This invention relates to sensing devices and more particularly to bank angle sensors for motor vehicles.

It is desirable to sense the tilt or bank angles of vehicles and other devices so that an alarm or corrective action may be actuated if the device tilts through some critical angle.

Many types of tilt angle sensors are known. For example, U.S. Pat. Nos. 4,972,595; 5,209,343; 5,202,559; 5,332,867; and 5,365,116 disclose angle sensors or angle switches which include moveable elements, such as balls or large weights, that are loosely confined in an enclosure. These devices are actuated when the enclosure is tilted to move the ball or weight into a position where switch contacts or other sensors are actuated. These prior art tilt sensors are not wholly satisfactory for use in motor vehicles, such as motorcycles, because vibrations and shocks which occur during operation may cause displacement of the moveable element to trigger a false indication.

Some prior art tilt angle sensors, such as that disclosed in U.S. Pat. No. 5,365,671, employ a liquid dampener within the enclosure to minimize the affects of vibrations and jolts. However, liquid dampening has also not been wholly satisfactory because of inconsistent performance. For example, liquids form a surface layer between the moving element and the walls of the enclosure and in the surface layer surrounding the air bubble above the liquid. As a result, the moving element experiences random drag causing actuation at different levels and with different time delays. Variations in response are also introduced by temperature variations which changes the viscosity of the dampening liquid. Leakage also causes erroneous signals in devices employing dampening liquids, such as, oils which are difficult to seal.

SUMMARY OF THE INVENTION

It is an object of the invention to provide a new and improved tilt angle sensor.

Another object of the invention is to provide a tilt angle sensor which is not actuated by vibrations or jolts.

A further object of the invention is to provide a tilt angle sensor which provides an accurate and uniform response.

Yet another of the invention is to provide a tilt angle sensor which is not subject to output errors due to wide temperature variations.

Still another object of the invention is to provide a tilt angle sensor which is suitable for use in motor vehicles, such as motorcycles.

These and other objects and advantages of the present invention will become more apparent from the detailed description thereof taken with the accompanying drawings.

According to one of its aspects, the invention comprises a tilt angle sensor which includes a body having a cavity formed therein and including a lower end and a pair of surfaces inclined upwardly from the lower end at the same vertical angle relative to a horizontal plane, roller means disposed in the cavity for movement along one of the surfaces and away from the lower end of the cavity when the sensor tilts through an angle equal to or greater than the inclination angle of the passages, sensing means and timing means. The sensing means is responsive to movement of the roller means away from the lower end of the cavity for actuating the timing means which is operative to produce an output signal after a predetermined time delay. The sensing means is also operative to reset the timing means if the roller returns to the lower end of the cavity prior to completion of the time delay.

According to another one of its aspects, the invention comprises a vehicle bank angle sensor including a body, a

2

V-shaped space formed in the body and defined by first and second intersecting linear passages formed in the body and inclined at the same angle relative to a horizontal plane, the intersection of the passages defining the lower end of the cavity. Roller means are disposed in the cavity and sized for movement along one of the passages when the body tilts through an angle equal to or greater than the inclination angle of the passages, and means for sensing movement of the roller means away from the lower end of the cavity and along one of the passages.

BRIEF DESCRIPTION OF THE DRAWINGS

FIG. 1 is a front view of a tilt angle sensor according to the invention; and

FIG. 2 schematically illustrates the tilt angle sensor according to the preferred embodiment of the invention.

DETAILED DESCRIPTION OF THE PREFERRED EMBODIMENT

FIG. 1 shows a tilt angle sensor 10 according to the preferred embodiment of the invention to include a housing 11 for containing a body 12 having a V-shaped cavity 14 formed therein. The cavity 14 is defined by a pair of linear passages 16 and 18 each of which has an axis 19 forming an angle α with a horizontal plane 20. The passages 16 and 18 intersect at their lower ends to define the lower end 22 of the cavity 14. A magnetic ball 23 is disposed within the cavity 14 and is sized to permit rolling movement into each of the cavities and away from the lower end 22 when the body 12 is tilted about a horizontal axis perpendicular to the plane defined by the axes 19 and in either direction through an angle equal to or greater than α.

A Hall effect sensor 24 is disposed in the housing 11 and adjacent the lower end 22 of the V-shaped cavity 14. As those skilled in the art will appreciate, the Hall effect is the electric field which is created when a current carrying conductor is placed in a magnetic field whose direction is perpendicular to that of the current. The Hall effect electric field is used to generate a signal which actuates a control circuit 26 schematically illustrated in FIG. 2.

In particular, the control circuit 26 includes an amplifier 28 coupled to receive the signal from the Hall effect sensor 24. The output signal from the amplifier 28 is operative to actuate a timing circuit 30. A latching circuit 32 is connected to the timing circuit 30 and is operative upon receipt of the time delay signal to latch an output driver 34 which in turn initiates the operation of an actuator 36.

While the timing circuit may take any conventional form, in the illustrated embodiment it comprises an RC circuit consisting of a resistor R1 and a capacitor C1. Operation of the timing circuit 30 is initiated by a switching circuit device, such as SCR1. When the ball 23 is in the lower portion of the cavity 14 and adjacent the Hall effect sensor 24, a signal from sensor 24 is provided to the amplifier 28 which in turn provides a gate signal to SCR1. As a result, SCR1 is conductive and shunts charging current around capacitor C1.

If the body 12 is tilted in either direction through an angle equal to or greater than α, the ball 23 will move along one of the passages 16 or 18. Movement of the ball 23 away from the Hall effect sensor 24 terminates the signal to the amplifier 28. As a result, SCR1 turns off and charging current flows to capacitor C1 through resistor R1. The relative impedances of resistor R1 and capacitor C1, determines the time required for the voltage across capacitor C1 to reach a predetermined level. Resistor R1 or capacitor C1 may be adjustable so that the time delay of the circuit 30 can be varied from about 0.1 seconds to several minutes.

Should the movement of the ball 23 away from the Hall effect sensor 24 be transient or the result of vibrations or jolts, the ball 23 will return to the lower end 22 prior to the expiration of the time delay so that the signal from the Hall effect sensor is resumed. The resumption of the Hall effect signal before the expiration of the time delay turns on the switching circuit device SCR1. This discharges capacitor C1 through resistor R2.

Preferably, the resistance R2 is much smaller than resistance R1 so that the time required to discharge capacitor C1 when SCR1 is conducting is much smaller than the time required for charging. As a result, the return of the ball 23 to the bottom 22 of cavity 14 after momentary displacement rapidly discharges the capacitor C1 so that the timing circuit 30 is reset. This eliminates erroneous actuation of the output driver 34 due to vibration, bouncing, curbing and other normal operating occurrences.

If the body 12 remains tilted for the time delay of circuit 30, the capacitor C1 charges to a predetermined voltage level. The latching circuit 32 includes a solid state latching device which, upon receipt of an input voltage signal having a predetermined magnitude, operates to provide a signal to the output driver 34. Once initiated, the output signal from the latching circuit 32 continues until its applied voltage is removed regardless of the continuation of the signal from timing circuit 30. The time required for the capacitor C1 to charge to the level required to operate latching circuit 32 depends upon the resistance of resistor R1 and the capacitance of capacitor C1. When the tilt angle sensor 10 is used in connection with motorcycles, the time delay is preferably about 0.7 to 1.3 seconds. However, it will be appreciated that for other applications, other time delays are appropriate.

When the latching circuit 32 is activated and latches, a signal is provided to output driver 34. This initiates the operation of an actuator 36 which may take any form appropriate to the particular application. For example, the actuator may operate an alarm, a light signal, or in the case of a motor vehicle, may deactivate the engine or remove power from the drive wheels.

By providing a V-shaped cavity, the ball 23 is retained in the passages 16 or 18 when the vehicle is tilted. As a result, the ball is less likely to be displaced by vibrations or jolts back to the lower end 22 of the cavity 14 once the critical tilt angle has been achieved.

While different bank angles are appropriate for different application, an angle of about 35° is employed in the preferred embodiment in the case of a motorcycle. When the vehicle tilts to an angle equal to or greater than 35°, and remains at that angle for the time delay of circuit 30, the actuator causes a power interruption to the controlled circuits. The actuator is also latched by the latching circuit 32 so that the controlled circuits remain off even if the vehicle is returned to its vertical position. The bank angle device can be reset only if the ignition switch SW1 is turned off thereby interrupting power to the latch circuit 32 and the output driver 34.

While only a single embodiment of the invention has been illustrated and described, it is not intended to be limited thereby, but only by the scope of the appended claims.

I claim:

1. A tilt angle sensor for a motor vehicle, including:
 a body, a cavity formed in said body and having a pair of inclined surfaces which intersect to define a lower end of said cavity;
 roller means formed of a magnetic material disposed in said cavity;
 a Hall effect sensor for sensing the presence of said roller means in the lower end of said cavity and being operative for changing a first signal when said roller means is displaced from the lower end of the cavity;
 a timing circuit coupled to the sensor for commencing a timing cycle upon the occurrence of said first signal and for providing a second signal after a predetermined time delay; and
 a latching circuit coupled to the timing circuit for latching an output device upon the occurrence of the second signal.

2. The tilt angle sensor set forth in claim 1 wherein said cavity is generally V-shaped.

3. The tilt angle sensor set forth in claim 2 wherein said first circuit means is operative to terminate said first signal upon the return of said roller means to the lower end of said cavity, said timing circuit means being operative to reset if said first signal is terminated.

4. The tilt angle sensor set forth in claim 3 wherein said V-shaped cavity is defined by first and second intersecting linear passages formed in the body and inclined at the same angle relative to a horizontal plane, the intersection of the passages defining the lower end of said cavity, said ball being sized for movement along one of the passages when the body tilts in either direction through an angle equal to or greater than the inclination angle of the passages.

5. The tilt angle sensor set forth in claim 1 wherein said first circuit means is operative to terminate said first signal upon the return of said roller means to the lower end of said cavity, said timing circuit means being operative to reset if said first signal is terminated.

6. The tilt angle sensor set forth in claim 1 wherein said sensor is operative to provide said first signal when said ball is displaced from the lower end of said cavity.

7. The tilt angle sensor set forth in claim 1 wherein the sensor provides a first signal when the roller means is disposed at the lower end of the cavity, and the timing circuit is responsive to the absence of the first signal for initiating a timing cycle.

8. A tilt angle sensor for a motor vehicle, including:
 a body, a cavity formed in said body and having a pair of inclined surfaces that intersect to define a lower end of said cavity;
 roller means disposed in said cavity;
 a sensor for sensing the presence of said roller means in the lower end of said cavity and being operative for sending a first signal when said roller means is displaced from the lower end of the cavity;
 an adjustable timing circuit coupled to the sensor for commencing a timing cycle upon the occurrence of said first signal and for providing a second signal after a selected time delay; and
 an output device responsive to the second signal.

9. The tilt angle sensor set forth in claim 8, wherein said adjustable timing circuit comprises an RC circuit having an adjustable resistor.

10. The tilt angle sensor set forth in claim 8, wherein said adjustable timing circuit comprises an RC circuit having an adjustable capacitor.

11. The tilt angle sensor set forth in claim 8, wherein said adjustable timing circuit can be varied from about 0.1 seconds to several minutes.

12. The tilt angle sensor set forth in claim 8, wherein said timing circuit is configured to select a time delay of about 0.7 to 1.3 seconds.

* * * * *